United States Patent
Greer, Jr.

(10) Patent No.: US 12,216,093 B1
(45) Date of Patent: *Feb. 4, 2025

(54) MATERIAL TESTING SYSTEM HAVING IMPROVED HYDRAULIC WEDGE GRIPS

(71) Applicant: Government of the United States, as represented by the Secretary of the Air Force, Wright-Patterson AFB, OH (US)

(72) Inventor: James M Greer, Jr., Colorado Springs, CO (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 453 days.

This patent is subject to a terminal disclaimer.

(21) Appl. No.: 17/975,846

(22) Filed: Oct. 28, 2022

Related U.S. Application Data

(63) Continuation of application No. 17/034,006, filed on Sep. 28, 2020, now Pat. No. 11,525,762.

(60) Provisional application No. 63/079,656, filed on Sep. 17, 2020.

(51) Int. Cl.
*G01N 3/04* (2006.01)
*G01N 3/08* (2006.01)
*G01N 3/10* (2006.01)

(52) U.S. Cl.
CPC ................. *G01N 3/04* (2013.01); *G01N 3/10* (2013.01); *G01N 3/08* (2013.01); *G01N 2203/04* (2013.01); *G01N 2203/0411* (2013.01); *G01N 2203/0441* (2013.01); *G01N 2203/0447* (2013.01)

(58) Field of Classification Search
CPC .. G01N 3/04; G01N 3/08; G01N 3/10; G01N 2203/0411; G01N 2203/0447; G01N 2203/04; G01N 2203/0441
See application file for complete search history.

(56) References Cited

U.S. PATENT DOCUMENTS

| | | |
|---|---|---|
| 5,021,612 A | 6/1991 | Joffe |
| 5,512,727 A | 4/1996 | Myers et al. |
| 7,739,919 B2 | 6/2010 | Lemmer et al. |

OTHER PUBLICATIONS

Power & Tel "AFL Telecommunications Speed Grip Spacer for 2 Bundle Conductors," Online Shop available at https://shop.ptsupply.com/shop/hardware/aerial/3302HT/, accessed Aug. 5, 2019, 2 pages total. (Year: 2019).*

* cited by examiner

*Primary Examiner* — Jonathan M Dunlap
(74) *Attorney, Agent, or Firm* — AFMCLO/JAZ; Larry L. Huston

(57) ABSTRACT

A material testing system that uses at least one hydraulic grip is improved with cable clips that are attachable to a respective lateral side of each hydraulic grip wedge. Each cable clip has another end that extends to engage a cable(s) extending from a corresponding wedge retention spring hole. The cable(s) enable manual extension of a wedge retention spring for engagement and disengagement from the hydraulic grip wedge. The cable clip maintains the cable in a noninterfering position during operational use of the material testing system.

11 Claims, 6 Drawing Sheets

MATERIAL TESTING SYSTEM HAVING IMPROVED HYDRAULIC WEDGE GRIPS

CROSS-REFERENCE TO RELATED APPLICATIONS

This application claims the benefit of priority under 35 U.S.C. § 119(e) to U.S. application Ser. No. 17/034,006 entitled "Material Testing System Having Improved Hydraulic Wedge Grips" filed 28 Sep. 2020 which in turn claims priority to U.S. Provisional Application Ser. No. 63/079,656 entitled "Material Testing System Having Improved Hydraulic Wedge Grips" filed 17 Sep. 2020, the contents of both of which are incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to material testing using hydraulic grips, and more particularly to material testing systems having hydraulic wedge grips with retention springs.

2. Description of the Related Art

Hydraulically actuated test frames are often used to evaluate the static and fatigue properties of materials. Two typical specimen retention methods are (1) pin-and-clevis and (2) hydraulic grips with wedges. An example of such material testing systems is MTS 810 material testing system by MTS Systems Corporation, Eden Prairie, Minn. When installing certain wedges used to grip test specimens with hydraulic grips on test machines, the cables used for installation must be left in place during subsequent testing. The cables are necessary for pulling the wedge retention springs up through the bottom of the wedge, via the wedge retention spring hole, where the end of the spring is retained by a wedge spring retention screw. The loose ends of these cables, if not restrained in some manner, can interfere with access to the test specimen and even cause minor injuries to fingers and hands.

SUMMARY

The present innovation overcomes the foregoing problems and other shortcomings, drawbacks, and challenges of hydraulically gripping a test specimen during material testing. While the present innovation will be described in connection with certain embodiments, it will be understood that the invention is not limited to these embodiments. To the contrary, this invention includes all alternatives, modifications, and equivalents as may be included within the spirit and scope of the present invention.

According to one aspect of the present innovation, a material testing system includes a load frame and at least one hydraulic grip fixture. The load frame includes a base positioned on a support surface. The load frame includes a pair of vertical columns extending upwardly from the base. The load frame includes a crosshead received for vertical movement on the pair of vertical columns. The load frame includes a pair of hydraulic linear actuators attached between the base and the crosshead to position the crosshead. Each of the at least one hydraulic grip fixture receives one end of a test specimen and is positioned between and attached to one of: (i) the lower attachment fixture and the crosshead. Each of the at least one hydraulic grip fixture includes: (i) a fixture body; (ii) a pair of hydraulic grip wedges; (iii) four retention springs; (iv) cables; (v) spring retention bolts; and (vi) cable clips. The fixture body has a wedge recess. The pair of hydraulic grip wedges are received in opposition within the wedge recess. Each hydraulic grip wedge has a pair of vertical wedge retention spring holes that are perpendicularly intersected respectively by a horizontal retention bolt hole. Four retention springs have one end attached to the fixture body and another end extending upward respectively in the vertical wedge retention spring holes. The cables are engaged to the other end respectively of each extension spring and extending out of the corresponding hydraulic grip wedge, enabling manual extension of the respective retention spring. The at least two spring retention bolts are received respectively in the horizontal retention bolt holes to attach to the other end of the wedge retention spring during extension by the corresponding cable. Four or more cable clips are respectively attached at one end to a lateral side of one of the pair of hydraulic grip wedges and engaged at another end to a corresponding cable to maintain the cable in a noninterfering position.

According to one aspect of the present innovation, a method includes attaching a fixture body of a hydraulic grip fixture to one of a lower attachment fixture and a crosshead of a load frame, the crosshead received for vertical movement on a pair of vertical columns extending upwardly from the base. The method includes attaching four wedge retention springs to a recess of the fixture body. The method includes passing respective one or more cables attached to each wedge retention spring through a corresponding vertical wedge retention spring hole in one of a pair of hydraulic grip wedges. With a respective wedge retention spring extended in the wedge retention spring hole by manual actuation of a corresponding cable, the method includes inserting a retention spring retention bolt through a horizontal bolt hole that intersects the vertical wedge retention spring hole. The method includes attaching one end of a cable clip respectively to each lateral side of the pair of hydraulic grip wedges. The method includes engaging another end of the cable clip to a corresponding cable to maintain the cable in a noninterfering position. The method includes engaging a test specimen between the pair of hydraulic grip wedges. The method includes actuating a pair of hydraulic linear actuators attached between the base and the crosshead to materially test the test specimen.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to aspects of the present disclosure, a material testing system that uses at least one hydraulic grip fixture is improved with cable clips that are attachable to a respective lateral side of each hydraulic grip wedge. Each cable clip has another end that extends to engage a cable extending from a corresponding wedge retention spring hole. The cable enables manual extension of a wedge retention spring for engagement and disengagement from the hydraulic grip wedge. The cable clip maintains the cable in a noninterfering position during operational use of the material testing system.

In one or more embodiments, the present innovation provides a convenient means of keeping cables out of the way of fingers and hands while a person is attempting to mount, un-mount or otherwise access a specimen being tested using the hydraulic wedge grips of a servohydraulic test machine. Today, the common method of restraining these wires is to use copious amounts of tape to tape the stiff wires out of the way. This is sometimes ineffective as the wires come loose from the tape, and it a wasteful use of tape.

Figure 1:
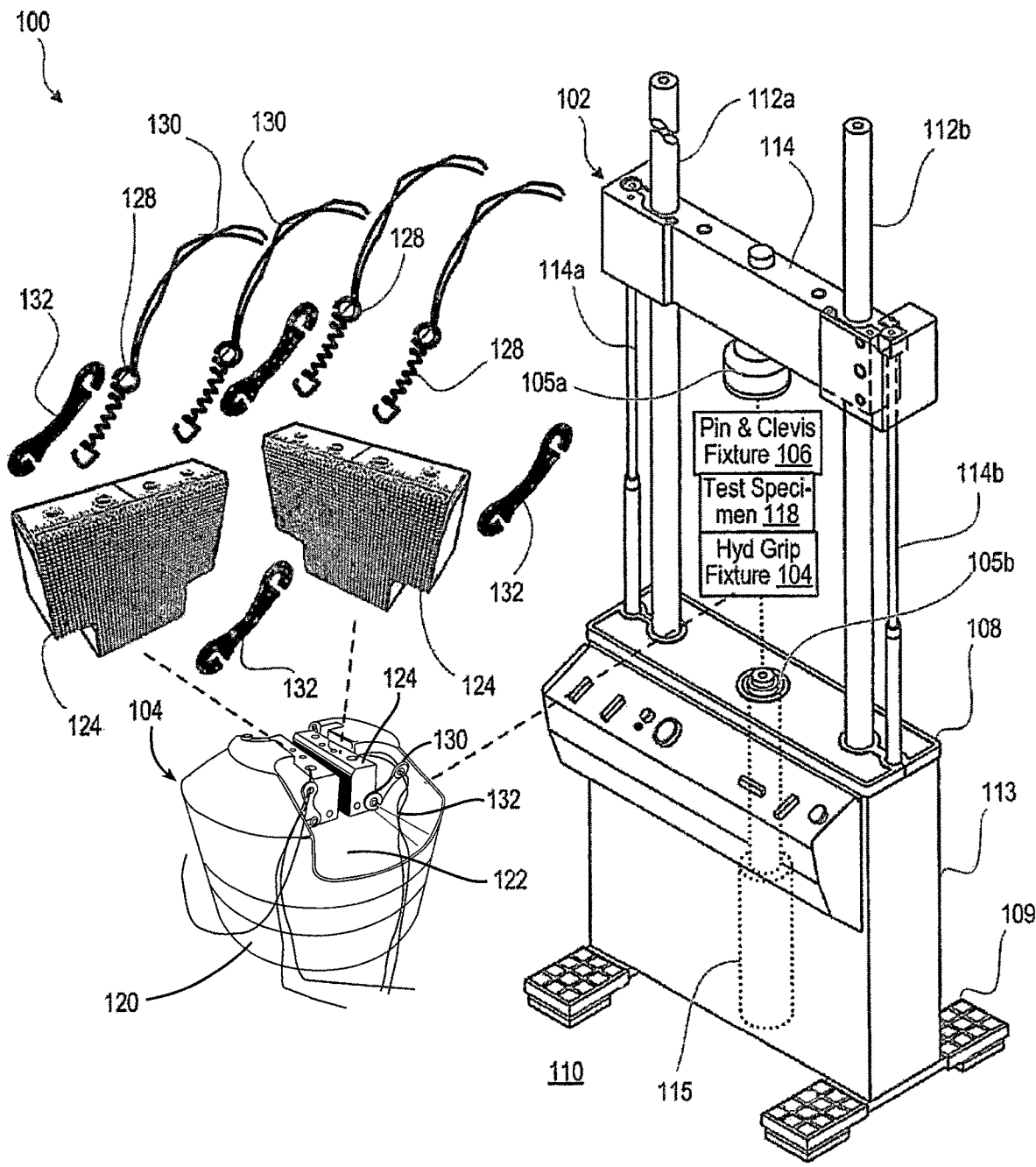
FIG. 1 illustrates a disassembled view of a material handling system having a load frame that utilizes one or two hydraulic grip fixtures, according to one or more embodiments.

FIG. 1 illustrates a disassembled view of a material handling system 100 having a load frame 102 that utilizes one or two hydraulic grips 104 attached respectively to upper and lower attachment fixtures 105a-105b. One of the upper and lower attachment fixtures 105a-105b can omit gripping, such as using a pin and clevis system 106 attached to upper attachment fixture 105a. The load frame 102 includes a base 108 having support feet 109 positioned on a support surface 110. A pair of vertical columns 112a-112b extend upwardly from a base housing 113 of the base 108. A crosshead 114 is received for vertical movement on the pair of vertical columns 112a-112b and provides the upper attachment fixture 105a. The base housing 113 encloses and supports a main actuator 115 that provides the lower attachment fixture 105b. A pair of hydraulic linear actuators 116a-116b attached between the base 108 and the crosshead 114 to position the crosshead 114 for the length of a test specimen 118. Crosshead 114 is then locked to vertical columns 112a-112b. The hydraulic grip 104 receives one end of the test specimen 118 and that is positioned between and attached to one of: (i) the base 108 and the crosshead 114. The hydraulic grip 104 includes a fixture body 120 having a wedge recess 122. A pair of hydraulic grip wedges 124 are received in opposition within the wedge recess 122. Each hydraulic grip wedge 124 are flexibly retained within the wedge recess 122 by wedge retention springs 128 that are extended by cables 130. After the retention springs 128 are attached to a respective hydraulic grip wedge 124, each cable 130 is held in positioned by a cable clip 132.

Figure 2:
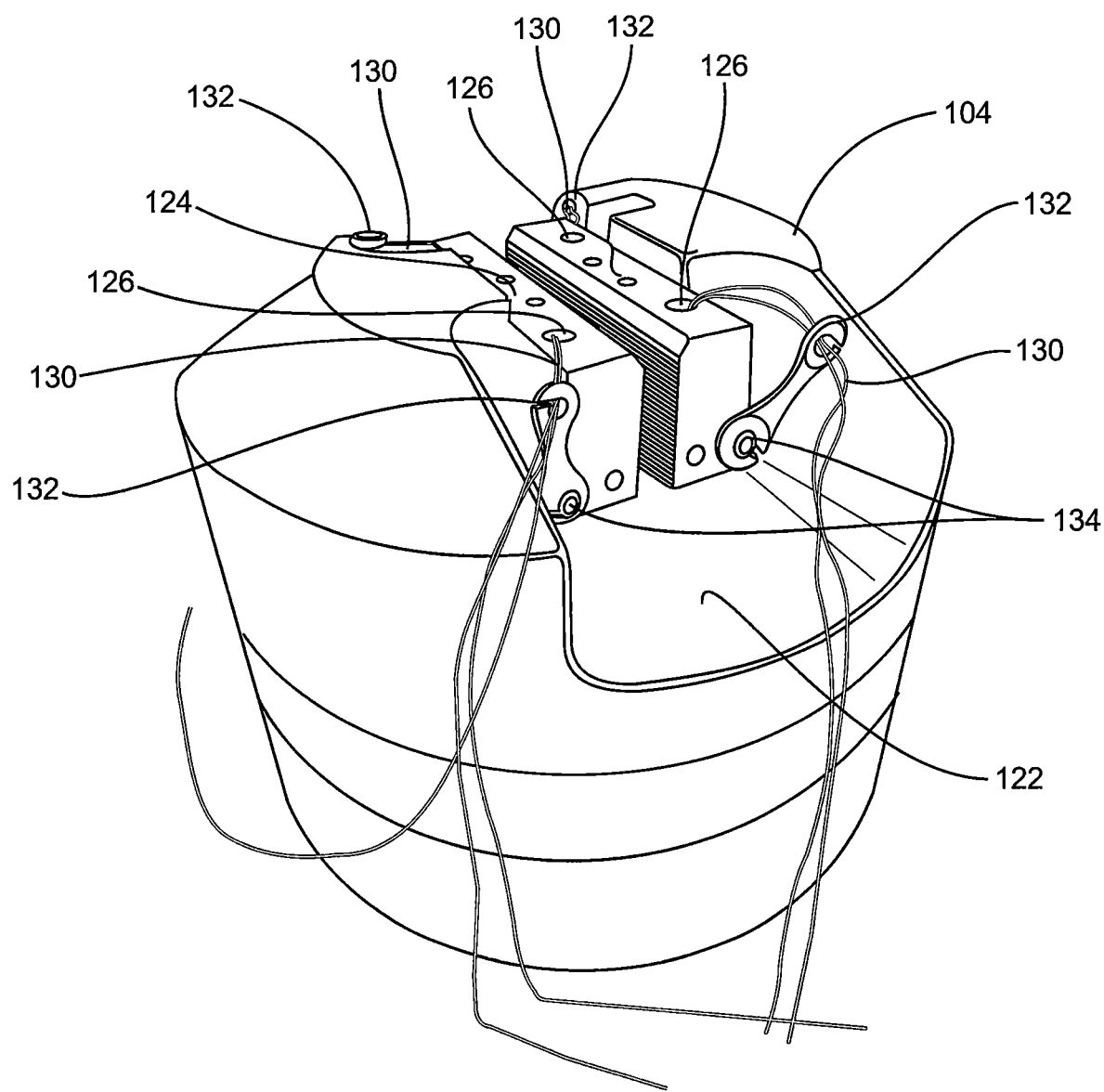
FIG. 2 illustrates a perspective view of the hydraulic grip fixture of FIG. 1, according to one or more embodiments.

FIG. 2 illustrates a perspective view of the hydraulic grip 104. Each hydraulic grip wedge 124 has a pair of vertical wedge retention spring holes 126 out of which the cables 130 extend for manual extension of the wedge retention springs 128 (FIG. 1). The cables 130 are maintained in a noninterfering position by cable clips 132 that attach to a respective lateral side 134 of one of the hydraulic grip wedges 124. In one or more embodiments, the cable clips 132 engage spring retention bolts 134.

Figure 3A:
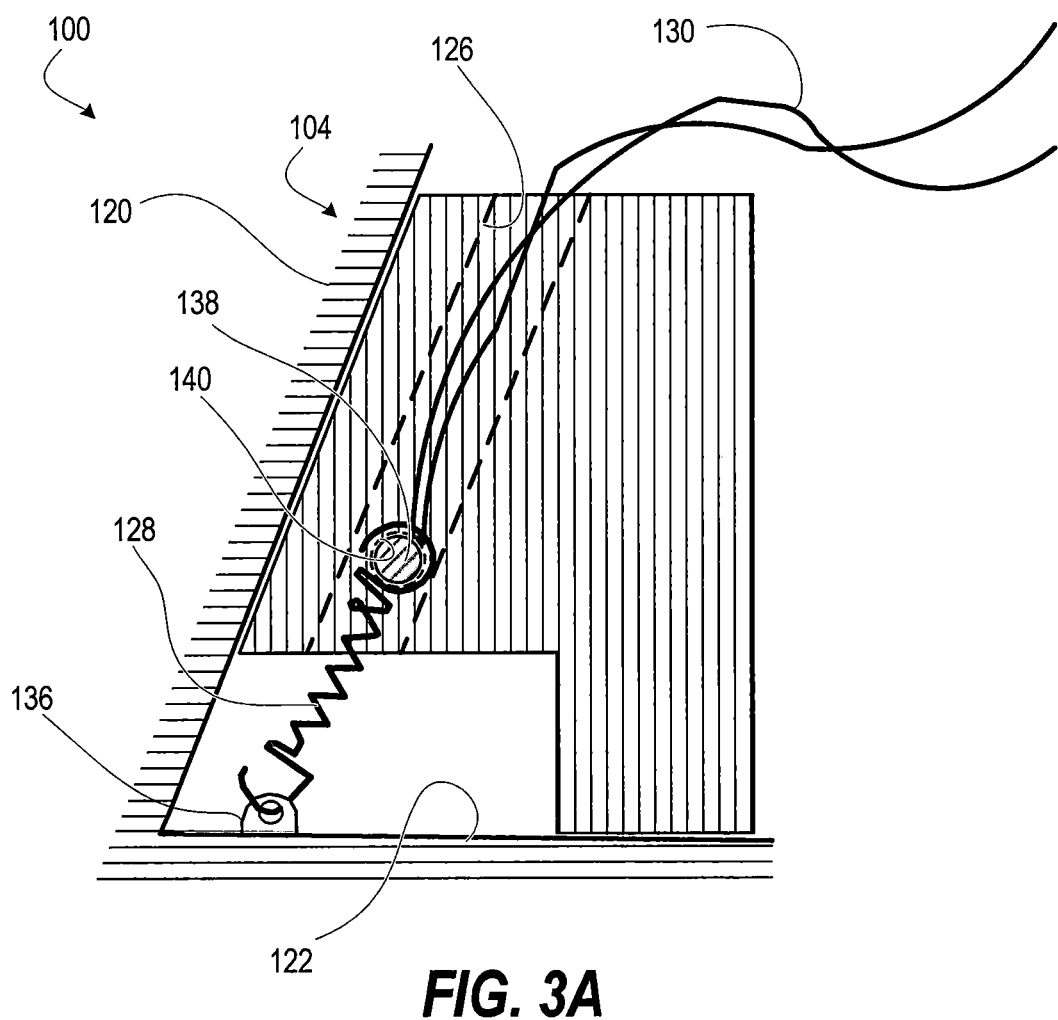
FIG. 3A is a partially cutaway detail view of a hydraulic grip wedge of the hydraulic grip fixture of FIG. 2, according to one or more embodiments.

FIG. 3A is a partially cutaway detail view of a hydraulic grip wedge 124 of the hydraulic grip 104. One vertical wedge retention spring hole 126 is depicted in phantom. A wedge retention spring 128 is hooked to an attachment eye 136 mounted to a lower surface of the wedge recess 122 of the fixture body 120 of the hydraulic grip 104. A spring retention bolt 138 is inserted through a horizontal spring retention hole 140 to engage a top end of the wedge retention spring 128. The cable 130 is engaged to the other end respectively of each extension spring 128 and extends out of the corresponding hydraulic grip wedge 124, enabling manual extension of the respective retention spring 128. In particular, the cable 130 enables aligning the free end of the wedge retention spring 128 with the horizontal spring retention hole 140 so that the spring retention bolt 138 may be inserted.

Figure 3B:
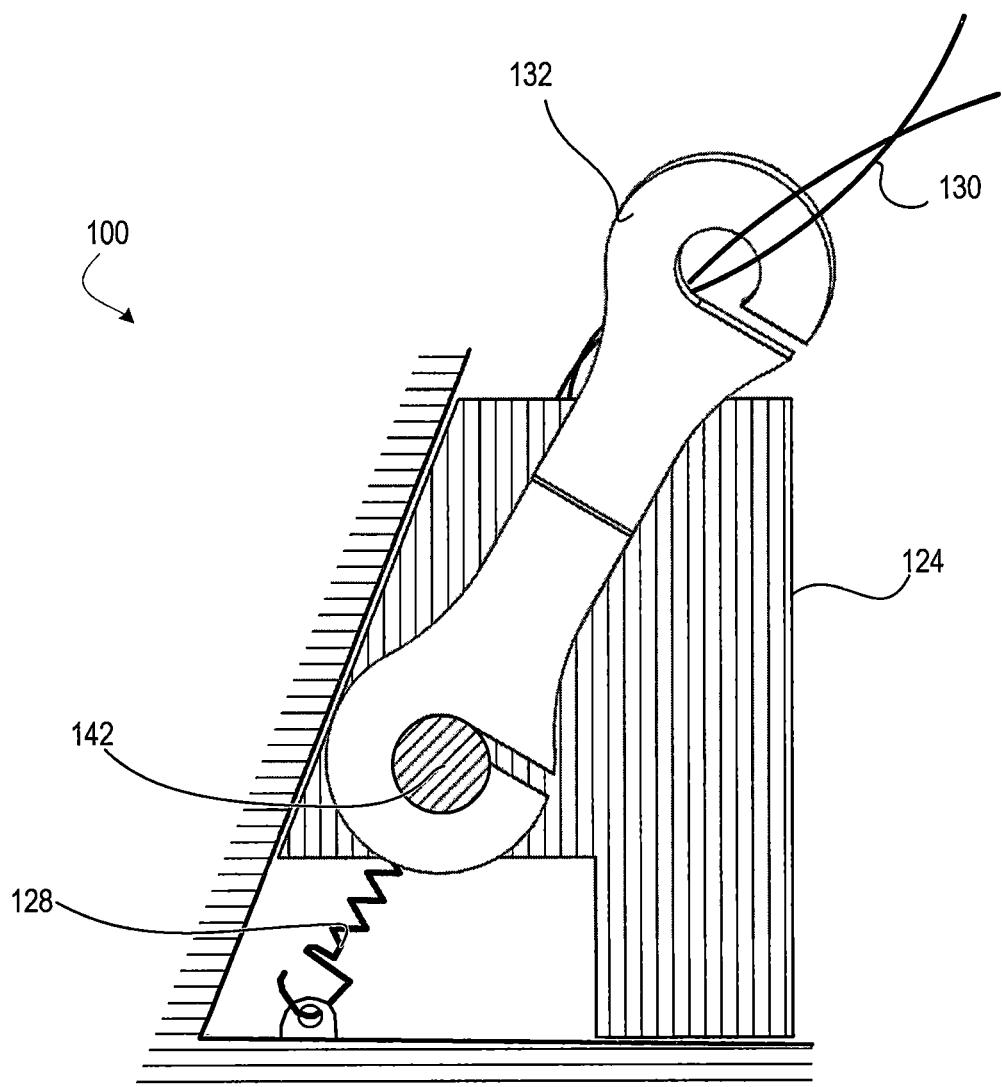
FIG. 3B is a detail view of a hydraulic grip wedge and cable clip of the hydraulic grip fixture of FIG. 2, according to one or more embodiments.

FIG. 3B is a detail view of the hydraulic grip wedge 124 and the cable clip 132 of the hydraulic grip 104. The hydraulic grip wedge 124 is allowed by the wedge retention spring 128 to move in and out of engagement with a test specimen 118 (FIG. 1). The cables 130 are maintained in a noninterfering position by cable clips 132 that attach to a respective lateral side 134 of one of the hydraulic grip wedges 124. The cable clips 132 are respectively attached at one end to a lateral side 134 of one of the pair of hydraulic grip wedges 124 and engaged at another end to a corresponding cable 130 to maintain the cable 130 in a noninterfering position. In one or more embodiments, the cable clip 132 resembles a bent combination wrench with partially open socket ends that end engaging to already installed bolt head 142 of the horizontal spring retention bolt 138 (FIG. 3A) and cable 130.

Figure 4A:
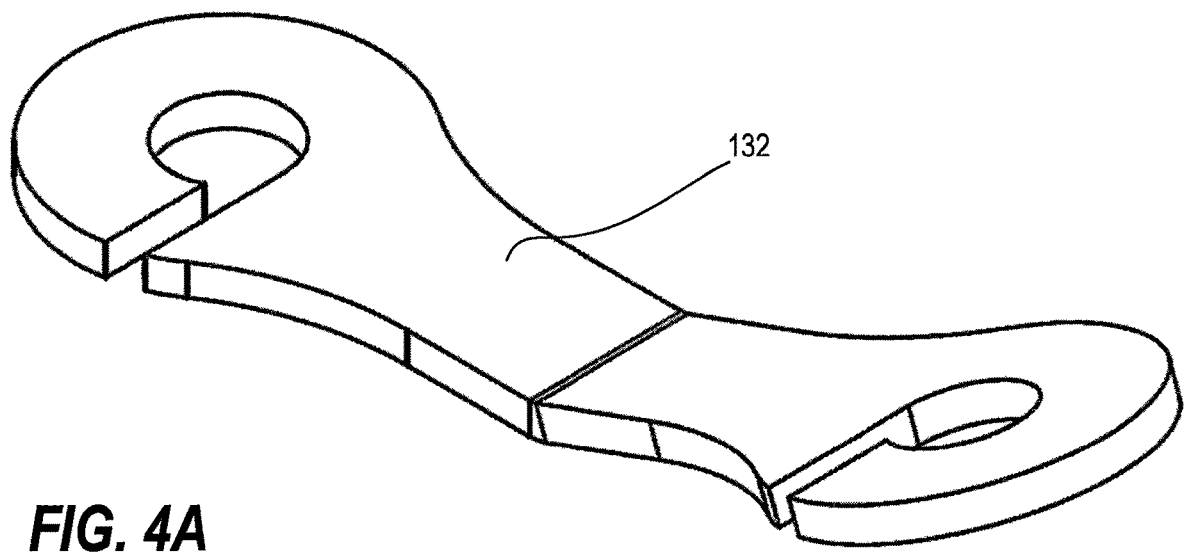
FIG. 4A is a perspective view of an example cable clip of FIG. 3B, according to one or more embodiments.
Figure 4B:
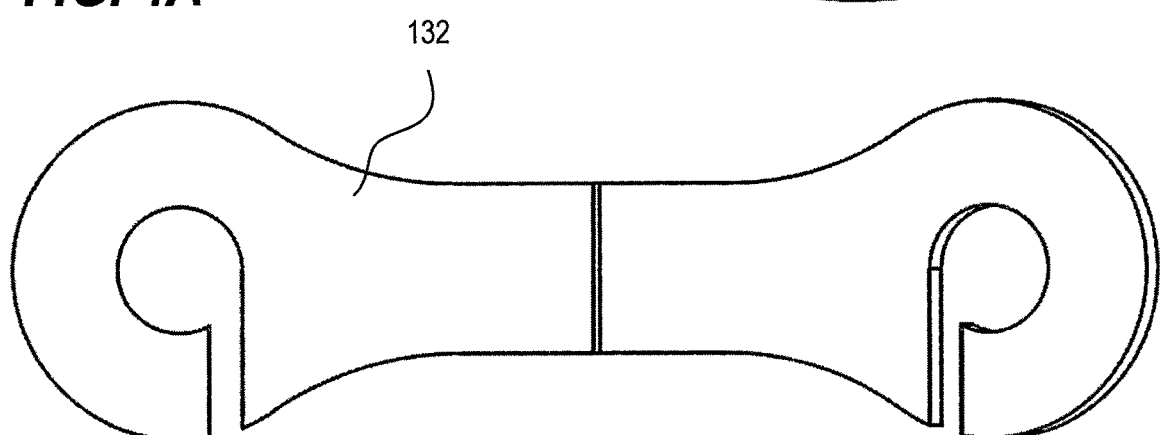
FIG. 4B is a top view of the example cable clip of FIG. 4A, according to one or more embodiments.
Figure 4C:
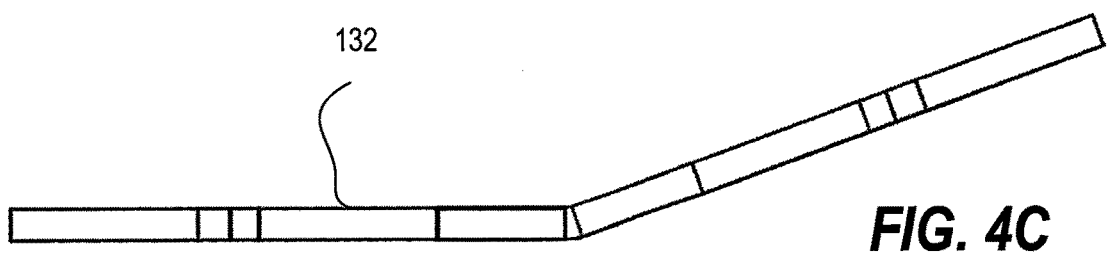
FIG. 4C is a side view of the example cable clip of FIG. 4A, according to one or more embodiments.
Figure 4D:
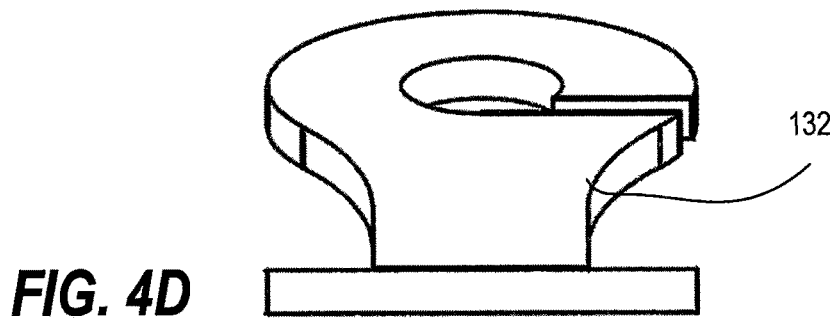
FIG. 4D is an end view of the example cable clip of FIG. 4A, according to one or more embodiments.

FIG. 4A is a perspective view of an example cable clip 132. FIG. 4B is a top view of the example cable clip 132. FIG. 4C is a side view of the example cable clip 132. FIG. 4D is an end view of the example cable clip 132. In one or more embodiments, the new clips provide a re-usable way to restrain these wires without using tape. The clip orientation can be adjusted, and the clip is reusable. The clips can be manufactured out of polymer material quickly using rapid prototyping (a 3D printer). The clips can be flat and semi-rigid having a hole for retention by the existing spring retention screw with an identical hole in the other end for retaining the cable. Both holes have slots for sliding the cable into the hole for retention. Both holes are slotted so that the clip can be installed either with the slots toward the front or rear of the machine, which gives additional flexibility in the cable orientation once retained. The clip is bent slightly in the middle, which retains the cable in a direction away from the specimen, and also improves ease of inserting the cable in the slot. The clip is easily installed by one person during wedge installation. Two clips are used for each wedge, and therefore eight clips per installation (four for the two lower wedges and four for the two upper wedges). The clip is easily fabricated, light in weight, effective and very inexpensive.

In one or more embodiments, a cable clip 132 has two configurations: slots forward, slots aft. The configuration is easily changed and depends upon where the cable is to be retained. A cable clip 132 could be machined from metal sheet (aluminum, steel, etc.), or, as has been done to date, a cable clip 132 can be fabricated from polymer using a rapid prototyping machine (3D printer). A cable clip 132 could be made from most any material sufficiently stiff to withstand handling, retain the cable in place, and be resilient to withstanding the friction from the existing spring retention screw.

Figure 5:
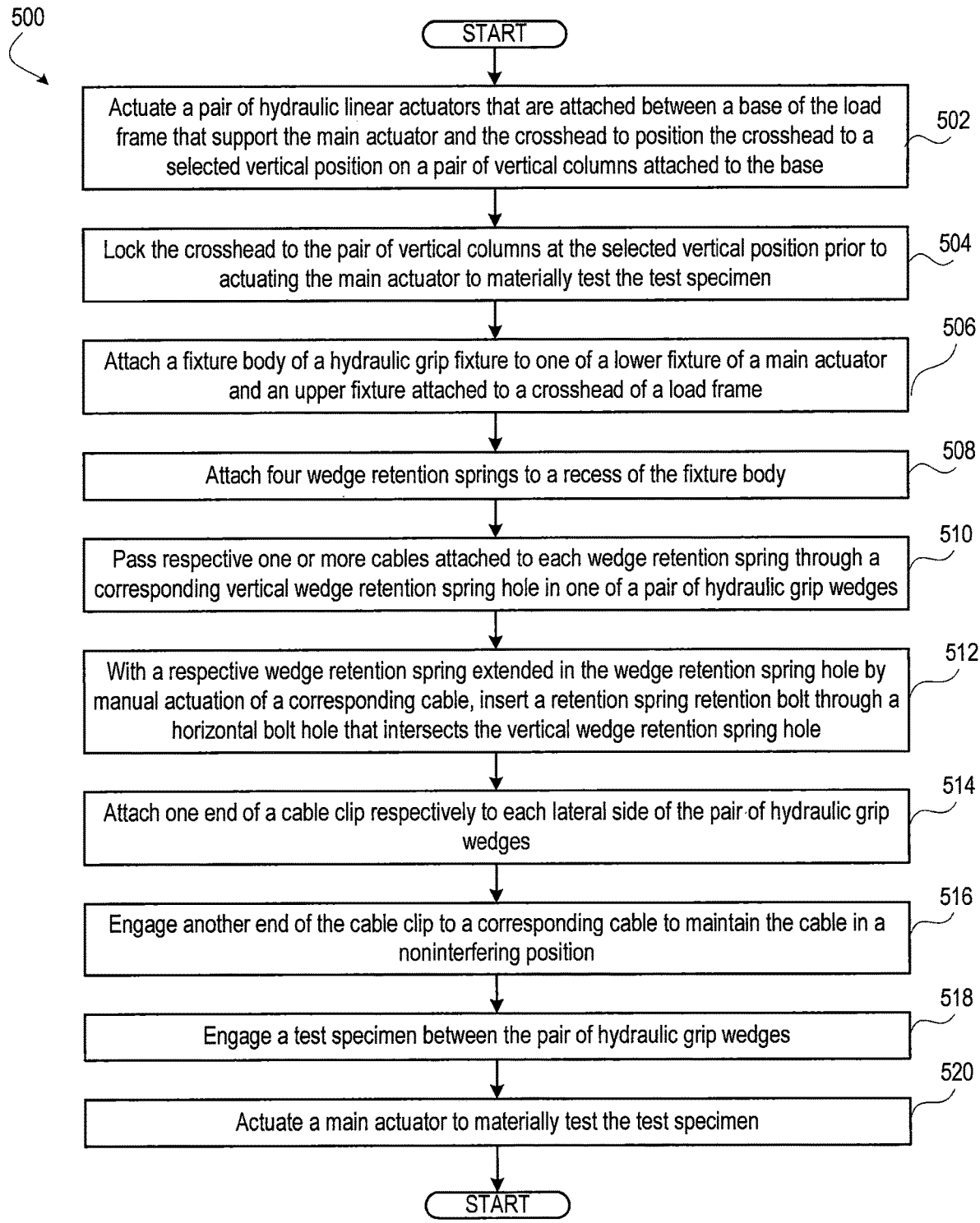
FIG. 5 presents a flow diagram of a method of performing material testing with an improved hydraulic grip fixture, according to one or more embodiments.

FIG. 5 presents a flow diagram of a method 500 of performing material testing with an improved hydraulic grip. The method 500 includes actuating a pair of hydraulic linear actuators that are attached between a base of the load frame that support the main actuator and the crosshead to position the crosshead to a selected vertical position on a pair of vertical columns attached to the base (block 502). The selected vertical position corresponds to a length of the test specimen. Method 500 includes locking the crosshead to the pair of vertical columns at the selected vertical position prior to actuating the main actuator to materially test the test specimen (block 504). The method 500 includes attaching a fixture body of a hydraulic grip to one of a lower attachment fixture atop a main actuator and an upper fixture attached to a crosshead of a load frame (block 506). The method 500 includes attaching four wedge retention springs to a recess of the fixture body (block 508). The method 500 includes passing respective one or more cables attached to each wedge retention spring through a corresponding vertical wedge retention spring hole in one of a pair of hydraulic grip wedges (block 510). The method 500 includes, with a respective wedge retention spring extended in the wedge retention spring hole by manual actuation of a corresponding cable to align the free end of the spring with the wedge retention spring hole, the method 500 includes inserting a retention spring retention bolt through the spring end via a horizontal bolt hole that intersects the vertical wedge retention spring hole (block 512). The method 500 includes attaching one end of a cable clip respectively to each lateral side of the pair of hydraulic grip wedges (block 514). The method 500 includes engaging another end of the cable clip to a corresponding cable to maintain the cable in a noninterfering position (block 516). The method 500 includes engaging a test specimen between the pair of hydraulic grip wedges (block 518). The method 500 includes actuating the main actuator to materially test the test specimen (block 520). Then method 500 ends.

For clarity, the material testing system is described herein as moving in a vertical direction, reducing the required footprint and enhancing access to each side of the test specimen and equipment. In one or more embodiments, aspects of the present innovation can be implemented in a horizontally oriented material testing system.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A material testing system comprising:
    a load frame comprising:
        a base positioned on a support surface,
        a main actuator supported by the base and below a lower attachment fixture that is actuated by the main actuator, and
        an upper fixture that is held at a distance from the lower attachment fixture; and
    at least one hydraulic grip that receives one end of a test specimen and that is positioned between and attached to one of: (i) the lower attachment fixture and the upper fixture and comprising:
        a fixture body having a wedge recess,
        a pair of hydraulic grip wedges received in opposition within the wedge recess, each hydraulic grip wedge having a pair of wedge retention spring holes that are intersected respectively by a retention bolt hole,
        four retention springs having one end attached to the fixture body and another end extending upward respectively in the wedge retention spring holes,
        a cable engaged to the other end respectively of each extension spring and extending out of the corresponding hydraulic grip wedge, enabling manual extension of the respective retention spring,
        at least two spring retention bolts received respectively in the retention bolt holes to attach to the other end of the wedge retention spring during extension by the corresponding cable, and
        four or more cable clips that are respectively attached at one end to a lateral side of one of the pair of hydraulic grip wedges and engaged at another end to a corresponding cable to maintain the cable in a noninterfering position.

2. The material testing system of claim 1, wherein the load frame further comprises:
    a pair of vertical columns extending upwardly from the base,
    a crosshead received for vertical movement on the pair of vertical columns and lockable at a selected vertical position on the pair of vertical columns that corresponds to a length of the test specimen, and
    a pair of hydraulic linear actuators attached between the base and the crosshead to position the crosshead to the selected vertical position.

3. The material testing system of claim 1, wherein the four or more cable clips each comprise an elongate strip having an aperture at both ends, one aperture attachable by a fastener to the corresponding lateral side of the one of the pair of hydraulic grip wedges, vertically positioning a first portion into contact with the corresponding lateral side, another portion of each cable clip bent at an acute angle away from a plane of the corresponding lateral side.

4. The material testing system of claim 3 wherein each of the four or more cable clips having an aperture at both ends comprises cable clips having a slotted aperture at both ends.

5. The material testing system of claim 1 wherein the four retention springs are extension springs.

6. The material testing system of claim 1 wherein the four retention springs are coil extension springs.

7. The material testing system of claim 1 wherein each of the four or more cable clips is polymeric.

8. The material testing system of claim 7 wherein the four or more cable clips are mutually identical in size.

9. A method comprising:
    attaching a fixture body of a hydraulic grip to one of a lower attachment fixture atop a main actuator and an upper attachment fixture attached to a crosshead of a load frame;
    attaching four wedge retention springs to a recess of the fixture body;
    passing respective one or more cables attached to each wedge retention spring through a corresponding wedge retention spring hole in one of a pair of hydraulic grip wedges;
    with a respective wedge retention spring extended in the wedge retention spring hole by manual actuation of a corresponding cable;
    inserting a retention spring retention bolt through a bolt hole that intersects the wedge retention spring hole;
    attaching one end of a cable clip respectively to each lateral side of the pair of hydraulic grip wedges;
    engaging another end of the cable clip to a corresponding cable to maintain the cable in a noninterfering position;
    engaging a test specimen between the pair of hydraulic grip wedges; and
    actuating the main actuator to materially test the test specimen.

10. The method of claim 9, further comprising:
    actuating a pair of hydraulic linear actuators that are attached between a base of the load frame that support the main actuator and the crosshead to position the crosshead to a selected vertical position on a pair of vertical columns attached to the base, the selected vertical position corresponding to a length of the test specimen; and
    locking the crosshead to the pair of vertical columns at the selected vertical position prior to actuating the main actuator to materially test the test specimen.

11. The method of claim 9 wherein the step of engaging another end of the cable clip to a corresponding cable to maintain the cable in a noninterfering position comprises sliding the cable through a slot and into the aperture of the cable clip.

* * * * *